United States Patent
Ohono et al.

(10) Patent No.: US 7,462,310 B2
(45) Date of Patent: Dec. 9, 2008

(54) POROUS LANDSCAPE PEBBLE AND METHOD OF MANUFACTURING THE SAME

(75) Inventors: Teruo Ohono, Matsuyama (JP); Masahiko Kan, Iyo-gun (JP)

(73) Assignees: Ohonokaihatsu Co., Ltd., Ehime (JP); Ehimeken, Ehime (JP)

(*) Notice: Subject to any disclaimer, the term of this patent is extended or adjusted under 35 U.S.C. 154(b) by 541 days.

(21) Appl. No.: 11/007,222

(22) Filed: Dec. 9, 2004

(65) Prior Publication Data

US 2005/0130828 A1 Jun. 16, 2005

(30) Foreign Application Priority Data

Dec. 11, 2003 (JP) ............... 2003-413822
Dec. 12, 2003 (JP) ............... 2003-415452

(51) Int. Cl.
*B29C 59/00* (2006.01)
(52) U.S. Cl. ............... 264/117; 106/705; 106/DIG. 1
(58) Field of Classification Search ............ 264/117; 106/705, DIG. 1
See application file for complete search history.

(56) References Cited

U.S. PATENT DOCUMENTS

| | | | | |
|---|---|---|---|---|
| 2,799,074 A | * | 7/1957 | Garloni | |
| 2,946,112 A | * | 7/1960 | Tucker, Jr. et al. | |
| 3,213,167 A | * | 10/1965 | Stirling | |
| 3,328,180 A | * | 6/1967 | Ban | 501/81 |
| 3,374,101 A | * | 3/1968 | Ban et al. | |
| 3,801,262 A | * | 4/1974 | Karkowski et al. | |
| 4,872,993 A | * | 10/1989 | Harrison | |
| 4,940,611 A | * | 7/1990 | Burnet et al. | |

FOREIGN PATENT DOCUMENTS

| | | | |
|---|---|---|---|
| EP | 566376 | A1 * | 10/1993 |
| JP | 59-21569 | * | 2/1984 |
| JP | 59021569 | * | 2/1984 |
| JP | 6-9251 | | 1/1994 |
| JP | 9-30857 | | 2/1997 |
| JP | 9-156998 | | 6/1997 |

OTHER PUBLICATIONS

Answer 19 of 23 of CA on STN☐☐"Stabilization of power plant fly ash and slag", Bures et al. CZ 282855 (abstract only) Nov. 12, 1997.*
Answer 15 of 23 of CA on STN☐☐"Fly ash utilization—a proven approach", Obe et al.☐☐Fly ash disposal & Utilisation, INt'l Conference, proceedings 2nd, New Delhi India, Feb. 2-4, 2000 vol. 1 3/19-3/24. abstract only.*

(Continued)

*Primary Examiner*—Paul Marcantoni
(74) *Attorney, Agent, or Firm*—Wenderoth, Lind, Ponack, L.L.P.

(57) ABSTRACT

Fly ash containing unburned carbon of at least 10 wt % is pelletized using water as a binder without substantial addition of an inorganic binder, into unsintered particles each having an average diameter of 2 mm to 30 mm. The unsintered particles pelletized are sintered at a temperature which allows the landscape pebble to have a compression strength of at least 50 N and a water absorption rate of at least 40 wt %.

9 Claims, 5 Drawing Sheets

OTHER PUBLICATIONS

Answer 14 of 23 of CA on STN "Aims and results of VGB's ERKOM research program for the utiliztion of coal combustion by products" Berg VBG PowerTEch (2001), 81(7), 85-88. abstract only.*

Answer 12 of 48 of CA on STN JP 05330898 Dec. 14, 1993 Kamya (abstract only).*

Answer 21 of 23 of CA on STN "Experience with inerting and stabilization of coal fly ashes and products from a semidry desulfurization process" Wurm et al. VGB TEchnishe VGB TB (1996), 34 pp. Paper P2. (abstract only).*

Answer 22 of 23 of CA on STN Utilization of industrial wastes for gardening materials Yamazaki et al. Aiichi ken Tokoname Yogyou Gijutsu Senta Hokoku (1992), 19, 23-6. (abstract only).*

Answer 18 of 23 of CA on STN "Erosion patterns on cultivated and uncultivated hill slopes determiend by soil fly ash contents" Hussain, Soil Science (1998), 163(9), 726-738.*

Answer 23 of 48 of CA on STN JP 58115078 (Jul. 8, 1983) Kobe Steel abstract only.*

Answer 25 of 48 of CA on STN JP 58115064 (Kobe steel) Jul. 8, 1983 abstract only.*

Answer 26 of 48 of CA on STN JP 58115065 (Kobe Steel) Jul. 8, 1983, abstract only.*

Answer 29 of 48 of CA on STN JP 57179067 A (Nov. 4, 1982) abstract only.*

Answer 24 of 48 of CA on STN JP 58115063 (Jul. 8, 1983) abstract only.*

* cited by examiner

POROUS LANDSCAPE PEBBLE AND METHOD OF MANUFACTURING THE SAME

BACKGROUND OF THE INVENTION

1. Field of the Invention

The present invention relates to a porous landscape pebble laid mainly on a ground, a building's roof, etc. to provide an excellent effect as a countermeasure against a heat island for a median strip of a road, a green zone or paving stone of a park, or gardening, and a method of manufacturing the same.

2. Description of the Related Art

Such a landscape pebble having an effect as a heat island countermeasure is required to be porous and capable of absorbing and holding a great quantity of water. The porous landscape pebble capable of holding much water is effectively cooled by high heat of evaporation of the held water. For this reason, spreading the porous landscape pebble has an effect as the heat island countermeasure. In summer, a heat island phenomenon occurs in many places to cause negative impacts on the living environment. For instance, in the cities when buildings are in close formation, because asphalt or concrete of a building roof, a park, a garden, a road, etc. is heated by the sun to cause the heat island phenomenon. In order to cope with the use of temperature caused by the heat island phenomenon to thus make a living space comfortable, air cooling is performed inside of the building. However, since the air cooling discharges heat than the quantity of heat to be cooled, this is responsible for further increasing temperature outside the building and thus raising temperature of the city. In this respect, a method of rooting up the heat island phenomenon is required. The porous landscape pebble is characterized by a capability to remove the heat island phenomenon and make the landscape beautiful. However, the pebbles which are produced by crushing ordinary stones are impossible to remove the heat island phenomenon. The landscape pebble for removing the heat island phenomenon requires all of the following (1) to (4) physical properties.

(1) To be porous and to contain a great quantity of water,
(2) To be lightweight,
(3) To be strong enough to resist destruction even when walked thereon, and
(4) To be inexpensive.

However excellent the landscape pebble may be in properties, its wide construction area dose not allow it to be practically used as long as the heat island phenomenon cannot be removed inexpensively and economically. Further, the landscape pebble is cooled by use of the evaporation heat of water. Hence, without preservation of a great quantity of water, it is impossible to effectively remove the heat island phenomenon for a long time. In addition, without being lightweight, it is impossible to spread the landscape pebble on the building roof, etc. Moreover, because the landscape pebble is mostly used for the place on which people walk, the landscape pebble is remarkably restricted to its application when it is so weak that is destroyed by walked upon.

Meanwhile, currently, the fuel used in a power plant, etc. is switched from heavy oil to coal, so that a large quantity of coal is used for the production of electrical power, etc. The coal is burnt after crushed and becomes fly ash. Therefore, up to now, a tremendous quantity of fly ash has been generated as a waste. The fly ash is of very fine inorganic particles. The fly ash is disposed by filled in cement, and its scrapped amount is too enormous to be developed in application and used effectively. For this reason, there has no choice but to dispose of the fly ash by a method such as landfill, etc. However, the fly ash is never preferred as a soil of landfill.

In order to make effective use of the fly ash, there has been developed a technique where the fly ash is sintered and used as an aggregate (see Japanese Patent Laid-Open Nos. 1997-156998, 1994-9251, and 1997-30857).

Japanese Patent Laid-Open No. 1997-156998 adds an inorganic binder to the fly ash and sinters the fly ash. The fly ash essentially consists of silicon dioxide and aluminum oxide, and cannot be sintered at a low temperature because the component corresponding to a fusing agent of a low melting point is small. Further, the fly ash has a narrow range of firing temperature, so that it cannot be sintered when the firing temperature is too low. To the contrary, when the firing temperature is too high, the whole is fused and sintered. In order to remove this problem, the technology described in Reference Document 1 adds a clay mineral, preferably bentonite, as the inorganic binder to the fly ash in a range of 3 to 5 wt % before firing. The fired formation can be sintered at a relatively low temperature. However, the sintered material has a drawback that the cost of raw material is increased because the inorganic binder is added to the fly ash. This is because the inorganic binder, i.e., bentonite is expensive in comparison with the fly ash as a waste. Further, the addition of the inorganic binder is responsible for decrease in the water absorption rate of a sintered body. This is because the inorganic binder is filled into pores in order to bind the fly ash, and thereby reducing porosity. Thus, when an aggregate is manufactured by this method, its manufacturing cost is raised. Nevertheless, there is a disadvantage that a characteristic of holding water, which is important for landscape pebble, is deteriorated.

Japanese Patent Laid-Open No. 1994-9251 discloses a method of manufacturing an artificial lightweight aggregate, comprising adding heavy oil ash having much unburned carbon to fly ash having little unburned carbon, pelletizing the fly ash and firing the pelletized fly ash. The heavy oil ash is mixed with the fly ash, so that the artificial lightweight aggregate is sufficiently sintered by the unburned carbon of the heavy oil ash. This method makes use of both of the fly ash and the heavy oil ash, as well as the heavy oil ash having much unburned carbon. For this reason, there is a drawback that it is troublesome to manage two kinds of raw materials. Furthermore, it is difficult to enhance the absorptive property and simultaneously extend a time capable of holding absorbed water according to the unburned carbon added through the heavy oil ash. This is because it is difficult to enhance porosity by forming micro pores in the aggregate sintered with the unburned carbon contained in the heavy oil ash. The heavy oil ash is added to the fly ash in place of pulverized coal, wherein the added carbon in the state of unburned carbon of the pulverized coal and the heavy oil ash is difficult to form the micro pores inside the aggregate. This is because the carbon is added and sintered to the outside of the fly ash, so that the pores caused by burning down the carbon are formed between the outsides of the fly ashes. Hence, this method also has a drawback in that, in spite of complicated method of manufacturing the aggregate by adding a specified quantity of heavy oil ash to the fly ash, the manufactured aggregate cannot be endowed with an excellent property.

Further, Japanese Patent Laid-Open No. 1997-30857 discloses a method of manufacturing a sintered body by sintering fly ash containing unburned carbon. In this document, sintering is performed by use of special fly ash having less unburned carbon, because the unburned carbon contained in the fly ash deteriorates a physical property of the sintered body. The unburned carbon of the fly ash is burnt to form pores, thus having influence on the physical property of the sintered body. Further, the unburned carbon is accompanied with air on porous surfaces, and the air is inflated and stripped on heating, so that a crack is generated in the sintered body. In addition, the oxidation atmosphere during sintering becomes a reduction atmosphere due to the burning of the unburned carbon, thus causing sintering defects. For these reasons, using the fly ash having less unburned carbon is described.

The present inventor makes effective use of unburned carbon which has been regarded to have an adverse effect on the sintered body of the fly ash, thereby succeeding in developing a landscape pebble capable of effectively removing the heat island phenomenon. Therefore, a main object of the present invention is to provide a landscape pebble and a method of manufacturing the same, capable of mass-producing the pebble at a low cost by increasing the porosity thereof to thus increase the water absorption rate in order to improve the water holding characteristic, and moreover by making the pores in a very fine state, and further by causing the whole to be lightweight and to have the sufficient strength in order to spread the landscape pebbles on the roofs etc., and additionally by using the fly ash containing the unburned carbon which is considered to be difficult to use effectively.

SUMMARY OF THE INVENTION

In order to achieve the above-mentioned objects, the present invention provides a method of manufacturing a porous landscape pebble, comprising: a pelletizing process of pelletizing fly ash containing unburned carbon of at least 10 wt % using water as a binder without substantially adding an inorganic binder and of forming the pelletized fly ash into unsintered particles having an average diameter of 2 mm to 30 mm; and a firing process of sintering the unsintered particles obtained in the pelletizing process at a temperature at which the landscape pebble has a compression strength of at least 50 N and a water absorption rate of at least 40 wt %.

In the landscape pebble manufacturing method of the present invention, in the pelletizing process, the core particles may be pelletized from the fly ash containing unburned carbon of at least 15 wt %. Further, in the pelletizing process, the core particles may be pelletized from the fly ash containing the unburned carbon of at least 20 wt %. In addition, in the pelletizing process, water may be added to the fly ash, the fly ash is rolled on a dish to be pellitized. Further, in the manufacturing method of the present invention, in the firing process, the firing temperature is in a range of 1050° C. to 1200° C.

The landscape pebble of the present invention is formed in such manner that a fly ash containing unburned carbon of at least 10 wt % without substantially containing an inorganic binder is pelletized into particles having an average diameter of 2 mm to 30 mm using water as a binder, and the pelletized particles are sintered at a temperature at which the landscape pebble has a compression strength of at least 50 N and a water absorption rate of at least 40 wt %. The landscape pebble preferably has a water absorption rate of at least 50 wt %.

The landscape pebble makes effective use of a tremendous quantity of fly ash generated as industrial waste. Nevertheless, a landscape pebble of an ideal physical property is obtained. The obtained landscape pebble is high in porosity and water absorption rate, and furthermore its pores become micro pores, so that an absorbed large quantity of water is effectively held for a long time. In this manner, why the landscape pebble of the present invention realizes the excellent physical property is that the fly ash containing unburned carbon of at least 10 wt % without adding an inorganic binder is pelletized using water as a binder, and the pelletized fly ash is sintered to be porous at a temperature at which the landscape pebble has a compression strength of at least 50 N and a water absorption rate of at least 40 wt %. The pores formed by sintering the unburned carbon contained in the fly ash become micro pores, thus remarkably improving a characteristic of the ability to hold water. For this reason, it is possible to significantly lengthen the time that the absorbed water is held. Further, the present invention sinters the fly ash without adding the inorganic binder. Thus, the present invention is characterized in that it is possible to save raw material costs, to provide mass production in a simple and efficient manner, and furthermore to enhance porosity.

The landscape pebble having the above-mentioned excellent physical properties is lightweight, so that it can reduce the weight applied to the building and be thickly laid on the roof, etc. A large amounts of landscape pebble, which are thickly laid on the building roof, hold a large quantity of water in the micro pores, and effectively cool the roof by means of high heat of evaporation of the held water. For this reason, by supplying water it is possible to make the roof cool, thereby very effectively preventing the heat island phenomenon of cities. In particular, the above mentioned landscape pebble forms micro pores using the unburned carbon, so that it can hold water for a very long time. Thus, the landscape pebble has a feature capable of effectively cooling the roof, etc. by means of the held water. Further, the above-mentioned landscape pebble is formed by sintering the fly ash containing unburned carbon of 10 wt % or more to have a compression strength of 50 N or more, so that the pebbles can be laid at a place, such as a roof or road on which people walk, thereby making the place cool.

Further, the above-mentioned landscape pebble is manufactured by using, as a raw material, the fly ash containing much unburned carbon which has been disposed due to its difficulty in effective use, so that it has a feature capable of providing the very excellent physical properties mentioned above, the very inexpensive price, and furthermore mass production.

Further, another method for manufacturing a landscape pebble according to the present invention, comprises: a pelletizing process of adding a binder to fly ash containing unburned carbon and pelletizing the fly ash into core particles; a coating process of coating the surfaces of the core particles obtained in the pelletizing process with an inorganic powder containing either fly ash having a less content of unburned carbon and a more content of iron oxide than the fly ash of the component or an inorganic powder including a fine rock powder to thus form surface layer on the core particles and of obtaining unsintered particles setting an average diameter to a range from 2 mm to 30 mm; and a firing process of firing the unsintered particles obtained in the coating process to sinter the core particles and their surface layers, both the core particles and the surface layer becoming porous and the surface layers being sintered to have a strength stronger than the core particles.

In the landscape pebble manufacturing method mentioned above, in the pelletizing process, core particles are pelletized from the fly ash containing unburned carbon of at least 5 wt %, or at least 10 wt %.

Further, in the sintering process of the above-mentioned method, the firing temperature is preferably set to a range of 1000° C. to 1200° C.

In the above-mentioned landscape pebble manufacturing method, sintering may be performed so as to form air layers between the core particles and their surface layers.

Further, a landscape pebble having a different structure according to the present invention is formed in such a manner that surfaces of core particles pelletized by adding a binder to fly ash containing unburned carbon is coated with either fly ash having a less content of unburned carbon than the fly ash constituting the core particles an inorganic powder containing a fine powder of a rock to thus form surface layers having an entire average diameter of 2 mm to 30 mm, both the core particles and their surface layers are made porous, and the surface layers are sintered to have a strength higher than the core particles. The landscape pebble can have air layers foamed between the core particles and their surface layers.

The landscape pebble of ideal physical propertied as described above is obtained by effectively using fly ash which is generated at a tremendous quantity as industrial waste. The obtained landscape pebble is high in porosity and water absorption rate, and furthermore its pores become micro pores, so that an absorbed large quantity of water is effectively held for a long time. In this manner, why the landscape pebble of the present invention realizes the excellent physical property is that the fly ash containing unburned carbon is pelletized into core particles; surfaces of the core particles are coated with either fly ash having a less content of unburned carbon and a greater content of iron oxide than the fly ash of the core particles or an inorganic powder including a fine powder of a rock to thus form surface layers, thereby forming unsintered particles. and the unsintered particles are sintered to have a strength that is higher than the core particles with both the core particles and their surface layers maintained to be porous and with the core particles maintained to be more porous than the surface layers. In the landscape pebble having a multi-layer structure of the core particles and their surface layers a high strength is not required of the core particles, so that it is possible to set the porosity, water absorption rate and water holding characteristic of this portion extremely high. In particular, preferably, in the firing process, the core particles are covered with their surface layer, thus have a temperature lower than the surface layer when heated. The fly ash decreases its strength but increases its porosity when fined at a low temperature. This is because the fly ash is less fused, and many micro pores are formed between the surface of the fly ash and the neighboring fly ash. For this reason, in the above-mentioned landscape pebble, the firing is carried out in such a manner that the core particles to have pores to the maximum extent, thus substantially improving the characteristics of absorbing and holding water. Further, the sintering is performed so as not only to form the pores only between the fly ashes, but also to form the pores by burning down the unburned carbon contained in the fly ash. Because the unburned carbon is contained in the respective fly ashes, the pores formed by burning down the unburned carbon become micro pores, thus remarkably improving the water holding characteristic of the landscape pebble.

Further, according to the present invention the surfaces of the core particles are covered with their surface layers, so that the internal core particles can be in a porous state, and simultaneously its surface can be in a strong state. The surface layer is sintered stronger than the core particles, so that it is possible to improve the entire strength of the landscape pebble. Generally, the sintered body of fly ash has a light color and when the sintered body is laid on a green zone or so forth, it does not provide a good appearance like a natural pebble. However, the landscape pebble of the invention has the surface layer of a powder of a natural rock or fly ash having a much content of iron oxide. Thus, the landscape pebble can be sintered to have a beautiful color. For this reason, the present invention is characterized in that the landscape pebble is capable of providing an attractive view when being laid on a green zone or a road.

BRIEF DESCRIPTION OF THE DRAWINGS

The above and further objects and features of the invention will be more fully apparent from the following detailed description with the accompanying drawings, in which.

DESCRIPTION OF THE PREFERRED EMBODIMENTS

A landscape pebble of the present invention is manufactured by the following processes.

(1) Pelletizing Process

In this process, water as a binder is added to fly ash containing unburned carbon of 10 wt % or more without substantially adding an inorganic binder, and pelletizes the fly ash into unsintered particles. The fly ash to be used preferably contains the unburned carbon of 15 wt % or more, and more preferably 20 wt % or more. The fly ash having a high content of unburned carbon may be used, thereby allowing porosity, i.e., water absorption rate, of the sintered landscape pebble to be higher. In particular, pores caused by the unburned carbon become very fine ones, thereby providing an effect of holding water for a long time. However, when the unburned carbon of the fly ash is too much, the strength of the landscape pebble is lowered. Thus, the content of the unburned carbon is set to 40 wt % or less, and preferably 30 wt % or less.

Water is used as a binder for binding and pelletizing the fly ash. Alternatively, a synthetic resin binder which is removed in a firing process, such as vinyl acetate resin, and PVA (polyvinyl acetate), may be added and used. The added amount of water, as the binder, is set to an amount, for example, 10 wt %, which allows the fly ash to be bond and pelletized. However, the pelletizing process may be carried out by setting the added amount of the binder to a range of 5 wt % to 20 wt %. The pelletizing process is performed by spraying water on the fly ash and simultaneously rolling it on a dish. However, the pelletizing process may be performed by adding water of 10 wt % to the fly ash, kneading the added result, and putting and pressing the kneaded result into a mold. In the pelletizing process, the mixture is pelletized into unsintered particles each having an average diameter of 2 to 30 mm, preferably 3 to 20 mm, and more preferably 5 to 15 mm.

(2) Firing Process

Figure 1:
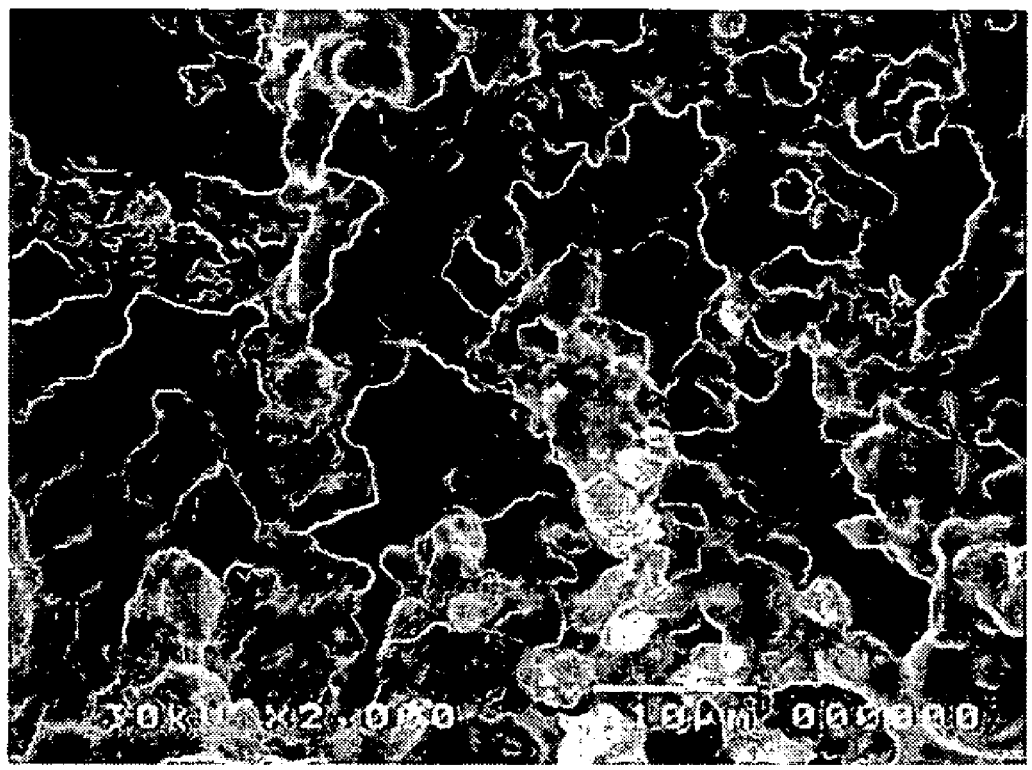
FIG. 1 is an electro microscope photograph of a landscape pebble related to an embodiment of the present invention.

After drying the unsintered particles, core particles are sintered together with their surface layers in this process. The firing temperature is set to a range from 1050° C. to 1200° C. When the firing temperature is low, it is impossible to sufficiently perform sintering, and thus the strength is lowered. By contrast, when the firing temperature is too high, the pores are reduced, and thus characteristics of absorbing and holding water deteriorate. In the firing process, the unburned carbon contained in the unsintered particles is burnt down, so that the unsintered particles become porous. The unburned carbon forms micro pores throughout the landscape pebble, thus making the landscape pebble porous. FIG. 1 is an electron microscope photograph showing a state where the interior of the landscape pebble is sintered to become porous. As shown in this figure, the interior of the landscape pebble is formed with many micro pores, and thus is capable holding water absorbed into the pores. In this state, the landscape pebble holding water in the internal fine pores realizes an excellent characteristic of holding water, thus holding water for a long time.

A landscape pebble is manufactured by the following processes.

(1) Pelletizing Process

Unsintered spherical particles are pelletized by spraying water as a binder onto fly ash containing unburned carbon of 30 wt % and rolling it on a dish. The added amount of water is set to 10 wt %. The average diameter of the pelletized core particles is set to 10 mm.

(2) Firing Process

The unsintered particles are dried, put into a firing furnace, and fired at a firing temperature of 1160° C. for one hour. The firing furnace is increased in temperature therein at a temperature gradient of 200° C./hour, maintained at 1160° C. for one hour, and subjected to natural cooling. The resulting landscape pebble is taken out of the firing furnace.

Figure 2:
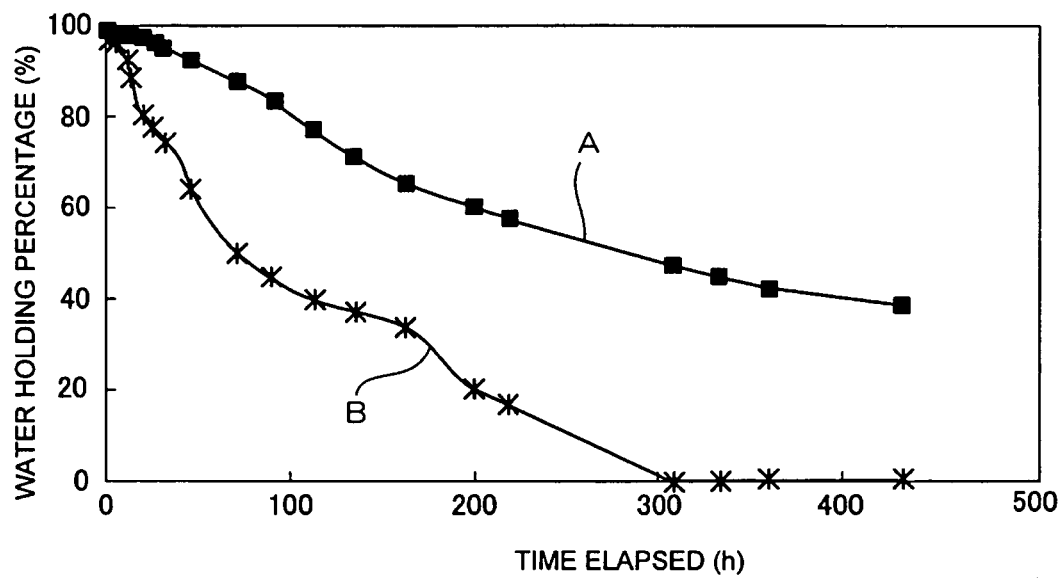
FIG. 2 is a graph showing a water holding characteristic of the landscape pebble related to the embodiment of the present invention.

The landscape pebble manufactured by the above-mentioned processes has a highly enhanced water absorption rate of about 60 wt %. The landscape pebble having the water absorption rate of 60 wt % holds water of 60 g in the landscape pebble of 100 g. In the case that the landscape pebble has an actual specific gravity of 2.6, the landscape pebble has a highly enhanced porosity of about 61%. Further, the landscape pebble realizes a very excellent characteristic of holding water because the water is absorbed into its micro pores. FIG. 2 shows the characteristic of holding water of the landscape pebble manufactured in this embodiment. In this figure, a curve A shows a state where water of the landscape pebble of this embodiment decreases, and a curve B shows a state where water of a brick manufactured in the same size of the landscape pebble decreases. This test was carried out within a room having a temperature of 40° C., and a humidity of 80%. The brick holds water, but it fails to hold water for a long time due to rapid discharge of the water held therein. By contrast, the landscape pebble of the present invention holds water of 40% even after the time of 400 hours (16.7 days) has lapsed, thus realizing the very excellent water holding characteristic.

Figure 3:
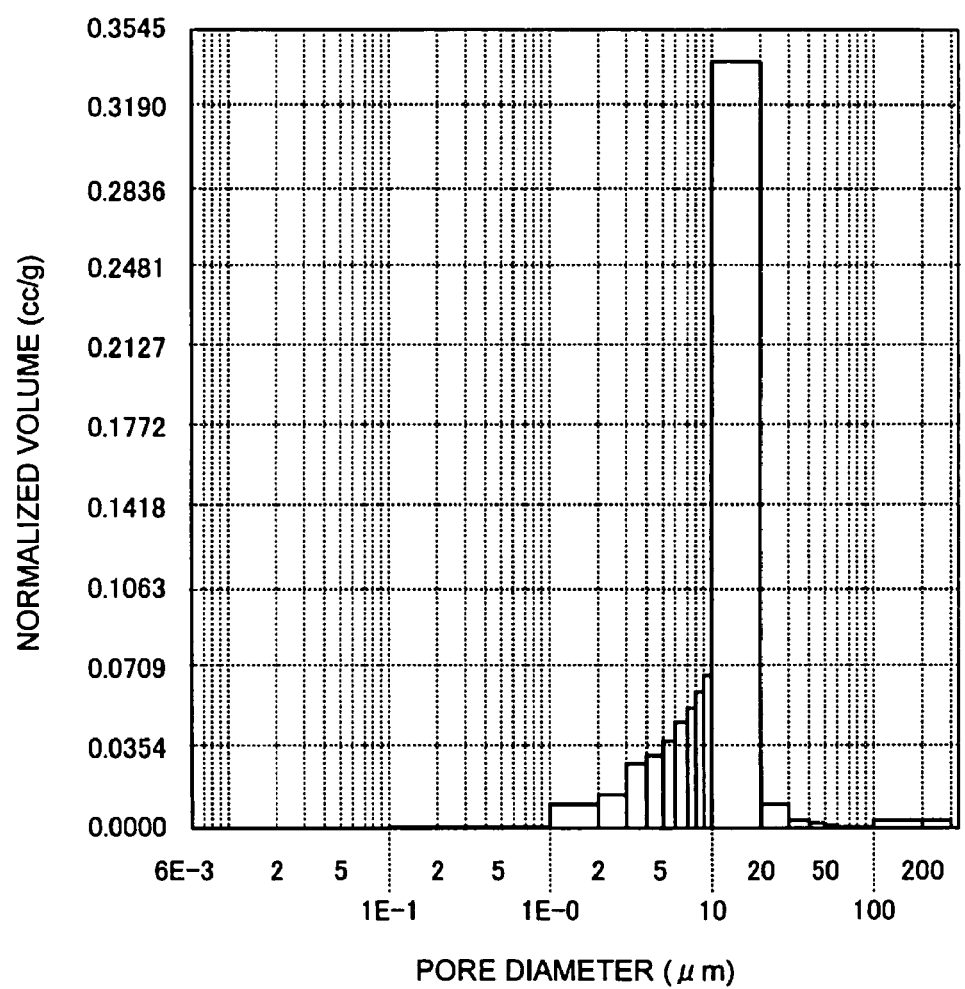
FIG. 3 is a graph showing pore distribution of the landscape pebble related to the embodiment of the present invention.
Figure 4:
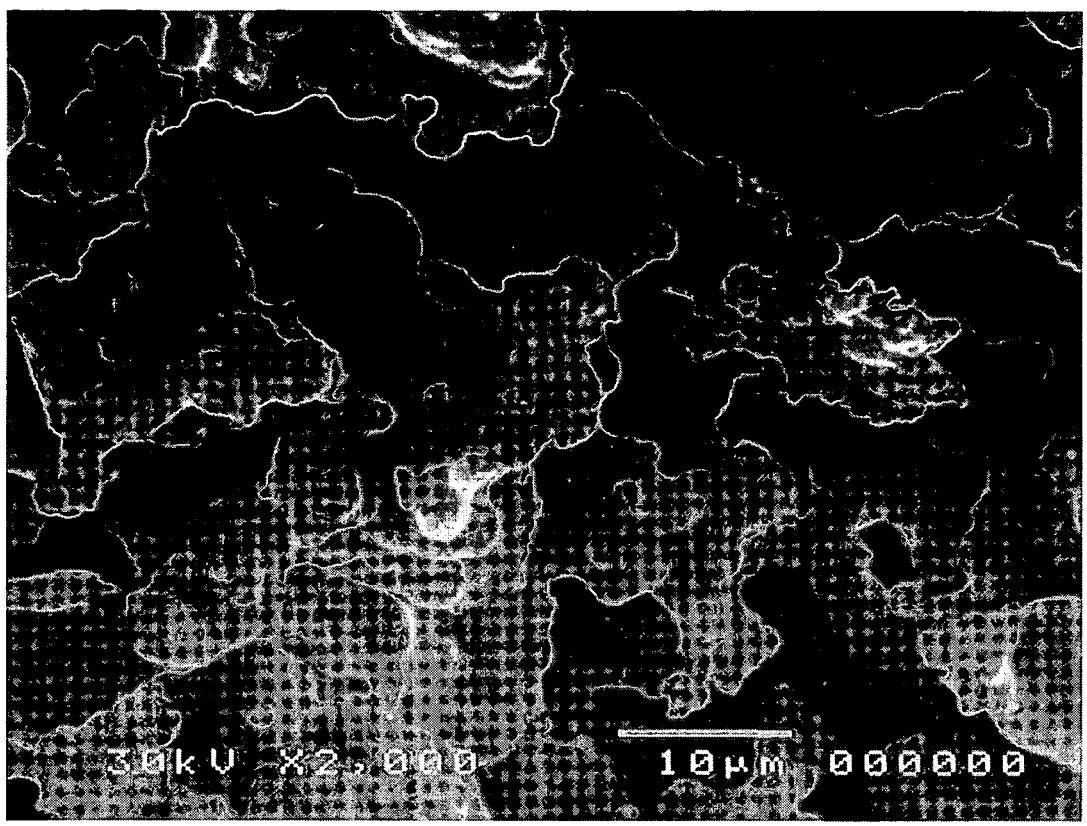
FIG. 4 is an electro microscope photograph of a landscape pebble related to another embodiment of the present invention.
Figure 5:
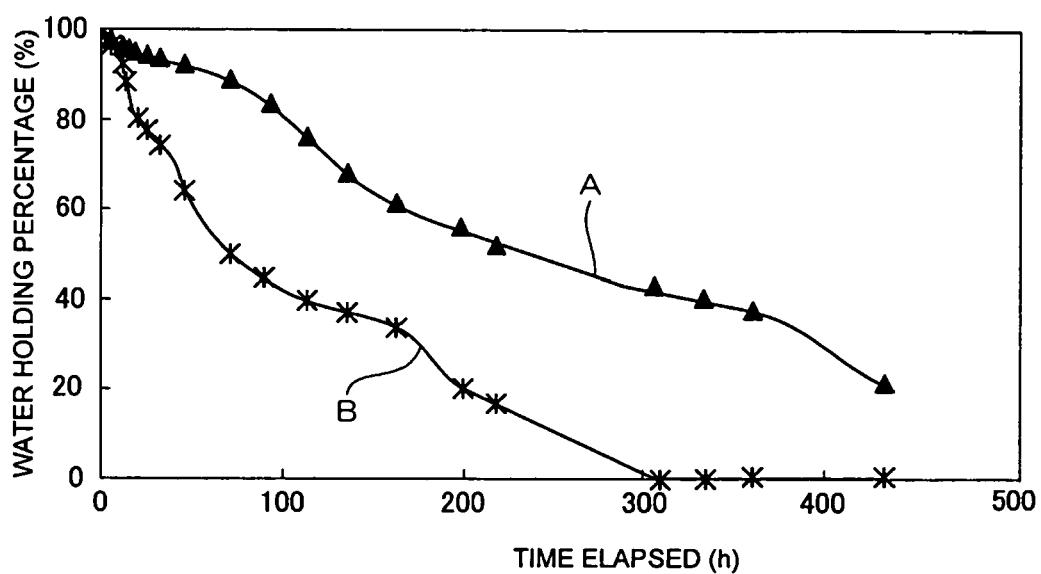
FIG. 5 is a graph showing water holding characteristic against time of a landscape pebble related to another embodiment of the present invention.

FIG. 3 is a graph showing pore distribution of the landscape pebble obtained in this embodiment. It can be seen from this graph that most of the pores of the landscape pebble of this embodiment have a dimension of 10 to 20 μm and thus are micro pores. However, this graph shows a fine pore diameter of pores measured by Hg injection.

Further, the manufactured landscape pebble reaches strength enough to resist destruction even when persons walk on a concrete or ground covered therewith. In order to measure destructive strength, the landscape pebble sintered in a spherical shape is interposed between flat metal surfaces which do not deform, and is locally pressed. The landscape pebble is not destroyed until it is pressed at a pressure of about 226N. Since the destructive test locally presses the landscape pebble on a very narrow region, when a pressing area is increased by disposing a rubbery elastic body, or the like, between the landscape pebble and the pressing surface, the destructive strength is highly increased. In fact, it is in this state that people tread on the landscape pebble with their shoes. This is because soles of the shoes are elastically deformed. When people tread on the landscape pebble with the shoe soles, a plurality of landscape pebbles are together trod by the shoe soles. Thus, pressure applied to any one of the landscape pebbles is less than a weight of person's body, and there is no case that the landscape pebble having the foregoing strength is destroyed by being trod.

Second Embodiment

Except that the firing temperature in the firing process of (2) is set to a range from 1160° C. to 1180° C., a landscape pebble is manufactured identically to the first embodiment. The landscape pebble manufactured in this embodiment has a highly enhanced water absorption rate of about 53 wt %. The landscape pebble having the water absorption rate of 53 wt % holds water of 53 g in the landscape pebble of 100 g. This landscape pebble, also, realizes a very excellent characteristic of holding water in the same way as that of the first embodiment because the water is absorbed into its micro pores, and holds water of about 40% even after the time of 400 hours (16.7 days) has lapsed.

Further, the manufactured landscape pebble realized a strength that is sufficient to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 248 N. Consequently, the landscape pebble of the second embodiment is considered to be stronger than that of the first embodiment. Thus, there is no case in which the laid landscape pebble is destroyed due to a weight of person's body when he or she treads it with shoes.

Third Embodiment

Except that the firing temperature is set to 1060° C., a landscape pebble is manufactured identically to the first embodiment.

The landscape pebble manufactured in this embodiment has a highly enhanced water absorption rate of about 49 wt %. The landscape pebble having the water absorption rate of 49 wt % holds water of 49 g in the landscape pebble of 100 g. This landscape pebble, also, realizes a very excellent characteristic of holding water in the same way as that of the first embodiment because the water is absorbed into its micro pores, and holds water of about 40% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 6.6 N, so that it is considered to be strong. Thus, there is no case that the covered landscape pebble will be destroyed due to a weight of a person's body when he or she treads it with shoes.

Fourth Embodiment

Except that the firing temperature of the firing process is set to 1110° C., a landscape pebble is manufactured identically to the third embodiment.

The landscape pebble manufactured in this embodiment has a highly enhanced water absorption rate of about 45 wt %.

The landscape pebble having the water absorption rate of 49 wt % holds water of 45 g in the landscape pebble of 100 g. This landscape pebble, also, realizes a very excellent characteristic of holding water in the same way as that of the first embodiment because the water is absorbed into its micro pores, and holds water of about 40% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 187 N. Thus, there is no case that the covered landscape pebble will be destroyed due to a weight of person's body when he or she treads on it with shoes.

A landscape pebble whose core particles is coated with a surface layers is manufactured by the following processes.

(1) Pelletizing Process

In this process, a binder is added to fly ash containing unburned carbon and palletized into core particles. The fly ash to be used contains the unburned carbon of 5 wt % or more, preferably 10 wt % or more, and more preferably 15 wt % or more. When the fly ash having a high content of unburned carbon is used porosity, i.e., water absorption rate, of the sintered landscape pebble can be made higher. In particular, pores caused by the unburned carbon become very fine ones, thereby providing an effect of holding water for a long time. However, when the unburned carbon of the fly ash is too much, the strength of the landscape pebble is lowered. For this reason, the content of the unburned carbon is set to 40 wt % or less, and preferably 30 wt % or less.

As a binder for binding and pelletizing the fly ash, water is used. In a process of adding water as the binder to the fly ash and pelletizing the fly ash, the core particles may be pelletized. However, as the binder, a synthetic resin binder which is burnt down in a firing process, such as vinyl acetate resin and PVA (polyvinyl acetate), may be used. The added amount of the binder is set to an amount which allows the fly ash to be bound and pelletized, for example, 10 wt %. In this case, the added amount of the binder may be varied according to a kind of the binder, for example, in a range of 5 wt % to 20 wt %. When water is used as the binder, the pelletizing process is performed by spraying water on the fly ash and simultaneously rolling it on a dish. However, the pelletizing process may be performed by adding water of 10 wt % to the fly ash, kneading the added result, and putting and pressing the kneaded result into a mold. In the pelletizing process, the kneaded result is pelletized into the core particles each having an average diameter of 1 to 25 mm, preferably 3 to 20 mm, and more preferably 5 to 15 mm.

(2) Coating Process

The core particles obtained in the pelletizing process are coated on a surface thereof with an inorganic powder, thus being formed into unsintered particles. The inorganic powder used for coating is either fly ash having a less content of unburned carbon and a more content of iron oxide than the fly ash constituting the core particles, or a fine powder of a rock. Further, as the inorganic powder, a mixture of the fly ash and the fine powder of a rock may be used. As the inorganic powder as the rock mixture, fine powder scraps of crushed rock, which are generated in the process of crushing a rock to produce an aggregate, may be effectively utilized. For the rock, either fine powder of a rhyolite or crushed sandstone may be used. The inorganic powder for coating the core particles contains a greater quantity of iron oxide than the fly ash of the core particles does. The inorganic powder containing iron oxide is fired in a reduction atmosphere and changes its color from brown to red, thereby providing a good appearance with the landscape pebble.

In the coating process, the average diameter of the unsintered particles is set to a range from 2 mm to 30 mm. The thickness of the surface layer stacked on the core particles by coating the inorganic powder varies, but is set to a range from 0.5 to 3 mm, for example, and preferably a range from 1 to 2 mm. Decreasing the thickness of the surface layer allows the water absorption rate of the landscape pebble to be enhanced. However, when the thickness of the surface layer is decreased, compression strength is lowered. By contrast, increasing the thickness of the surface layer allows the compression strength of the landscape pebble to be improved. Therefore, the thickness of the surface layer is set to an optimal value according to application of the landscape pebble. For the landscape pebble laid at a place where people frequently walk, the compression strength strong is increased by increasing the thickness of the surface layer. To the contrary, for the landscape pebble used at a place where persons do not frequently walk, for example, on the building roof or so forth, the thickness of the surface layer is decreased to make it lightweight and to improve the water absorption rate and water holding characteristic. In the coating process, even in the case of coating with the inorganic powder, water or a binder such as a synthetic resin, etc. is added to the inorganic powder. However, when the inorganic power is thinly coated on the surfaces of the core particles, the inorganic powder can be bound onto the surfaces of the core particles by water contained in the core particles without adding the binder.

(3) Firing Process

After drying the unsintered particles, the core particles are sintered together with its surface layer in this process. A firing temperature is set to a range from 1000° C. to 1200° C., and preferably a range from 1050° C. to 1200° C. When the firing temperature is low, it is impossible to sufficiently sinter the surface layer, and thus strength is lowered. By contrast, when the firing temperature is too high, the pores are reduced, and thus characteristics of absorbing and holding water are deteriorated. The surface layers are sintered stronger than the core particles. The firing process allows the unsintered particles to be fired to sinter the coated surface layer and its internal core particles. Both of the fired core particles and their surface layers become porous. As the unburned carbon contained in the internal core particles is burnt down, the internal core particles become porous. The surface layers become porous because the inorganic powder is sintered and pores are formed between the sintered inorganic powders. The core particles are formed with micro pores by the unburned carbon contained therein. Further, when the unburned carbon contained in the fly ash is burnt down, the core particles have the micro pores more than the surface layer, thus becomes more porous than the surface layer. In addition, the surface layer is heated at a higher temperature than the core particles, and contains the inorganic powder which is sintered easier than the fly ash, so that the surface layer is sintered to have a higher strength.

FIG. 1 is an electron microscope photograph of the landscape pebble. As shown in this figure, the core particles of the landscape pebble have many micro pores, and thus these micro pores improve the characteristics of absorbing and holding water.

Fifth Embodiment

A landscape pebble is manufactured by the following processes.

(1) Pelletizing Process

Spherical core particles are pelletized by spraying water as a binder onto fly ash containing unburned carbon of 30 wt % and rolling it on a dish. The added amount of water is set to 10 parts by weight with respect to 100 parts by weight of the fly ash. The average diameter of pelletized core particle is set to 10 mm.

(2) Coating Process

The core particles prepared in the pelletizing process are coated on its surface with an inorganic powder, and are thus formed into unsintered particles. As the inorganic powder, fly ash having unburned carbon of about 12 wt % is used. The thickness of the surface layer to be coated is set to 1 mm, and the average diameter of the unburned carbon is set to 12 mm. Similar to the pelletizing process, the coating process is performed by rolling the core particles on the dish, supplying the fly ash while spraying water, and coating the surfaces of the core particles with the fly ash having less unburned carbon.

(3) Firing Process

The unsintered particles are dried, put into a firing furnace, and fired at a firing temperature of 1140° C. for one hour. The firing furnace is increased in temperature therein at a temperature gradient of 200° C./hour, maintained at 1140° C. for one hour, and subjected to natural cooling. The resulting landscape pebble is taken out of the firing furnace.

The landscape pebble manufactured by the above-mentioned processes has a highly enhanced water absorption rate of about 50 wt %. The landscape pebble having the water absorption rate of 50 wt % holds water of 50 g in the landscape pebble of 100 g. In the case that the landscape pebble has an actual specific gravity of 2.6, the landscape pebble has a highly enhanced porosity of about 57%. Further, the landscape pebble realizes a very excellent characteristic of holding water because water is absorbed into its micro pores. FIG. 2 shows a characteristic that the landscape pebble manufactured in this embodiment holds water for a long time. In this figure, a curve A shows a state where water of the landscape pebble of this embodiment decreases, and a curve B shows a state where water of a brick manufactured in the same size decreases. However, this test was carried out within a room having a temperature of 40° C. and a humidity of 80%. The brick holds water as well, but it fails to hold water for a long time due to rapid discharge of the water held therein. By contrast, the landscape pebble of the present invention holds water of 30% even after the time of 400 hours (16.7 days) has lapsed, thus realizing the very excellent water holding characteristic.

Further, the manufactured landscape pebble realizes strength that is sufficient to resist destruction even when persons walk on a concrete or ground covered therewith. In order to measure destructive strength, the landscape pebble sintered in a spherical shape is interposed between flat metal surfaces which do not deform, and is locally pressed. The landscape pebble is not destroyed until it is pressed at a pressure of about 125N. Since the destructive test locally presses the landscape pebble on a very narrow region, when a pressing area is increased by disposing a rubbery elastic body, or the like, between the landscape pebble and the pressing surface, the destructive strength is highly increased. In fact, it is this state that in which any person treads the landscape pebble with his/her shoes. This is because soles of the shoes are elastically deformed. In the state of treading the landscape pebble with the shoe soles, a plurality of landscape pebbles are together trod by the shoe soles. Thus, pressure applied to any one of the landscape pebbles is less than a weight of person's body, and there is no case that the landscape pebble having the foregoing strength is destroyed by being trod.

Sixth Embodiment

Except that the firing temperature in the firing process of (3) is set to a range from 1140° C. to 1180° C., a landscape pebble is manufactured identically to the fifth embodiment. The landscape pebble manufactured in this embodiment has a highly enhanced water absorption rate of about 42 wt %. The landscape pebble having the water absorption rate of 42 wt % holds water of 42 g in the landscape pebble of 100 g. This landscape pebble, also, realizes a very excellent characteristic of holding water in the same way as that of the fifth embodiment because water is absorbed into its micro pores, and holds water of about 30% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 163 N. Consequently, the landscape pebble of the sixth embodiment is considered to be stronger than that of the fifth embodiment. Thus, there is no case that the covered landscape pebble will be destroyed due to a weight of person's body when he or she treads on it with shoes.

Seventh Embodiment

Except that as the coating inorganic powder scraps of crushed sandstone are used in place of the fly ash in the coating process, and the firing temperature is set to 1050° C. in the firing process, a landscape pebble is manufactured identically to the fifth embodiment.

The landscape pebble manufactured in this embodiment has a highly enhanced water absorption rate of about 36 wt %. The landscape pebble having the water absorption rate of 36 wt % holds water of 36 g in the landscape pebble of 100 g. This landscape pebble, also, realizes a very excellent characteristic of holding water in the same way as that of the fifth embodiment because water is absorbed into its micro pores, and holds water of about 30% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 220 N, and thus is considered to be stronger than those of the fifth and sixth embodiments. Thus, there is no case that the covered landscape pebble is destroyed due to a weight of person's body when he or she treads it with shoes.

Eighth Embodiment

Except that as the coating inorganic powder finely crushed rhyolite is used in place of the fly ash in the coating process, and the firing temperature is set to 1060° C. in the firing process, a landscape pebble is manufactured identically to the fifth embodiment.

The landscape pebble manufactured in this embodiment has a highly enhanced water absorption rate of about 38 wt %. The landscape pebble having the water absorption rate of 38 wt % holds water of 38 g in the landscape pebble of 100 g. This landscape pebble, also, realizes a very excellent characteristic of holding water in the same way as that of the fifth embodiment because water is absorbed into its micro pores, and holds water of about 30% even after the time of 400 hours (16.7 days) has lapsed.

Further, the manufactured landscape pebble realizes strength enough to resist destruction even when persons walk on a concrete or ground covered therewith. A destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 52 N. Thus, there is no case that the covered landscape pebble is destroyed due to the weight of person's body when he or she treads on it with shoes.

Ninth Embodiment

Except that the firing temperature of the firing process is set to a range from 1060° C. to 1100° C., a landscape pebble is manufactured identically to the eighth embodiment.

The landscape pebble manufactured in this embodiment has a highly enhanced water absorption rate of about 41 wt %. The landscape pebble having the water absorption rate of 41 wt % holds water of 41 g in the landscape pebble of 100 g. This landscape pebble, also, realizes a very excellent characteristic of holding water in the same way as that of the fifth embodiment because the water is absorbed into its micro pores, and holds water of about 30% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 115 N. Thus, there is no case that the covered landscape pebble will be destroyed due to the weight of person's body when he or she treads it with shoes.

Tenth Embodiment

Except that the firing temperature of the firing process is set to a range from 1060° C. to 1140° C., a landscape pebble is manufactured identically to the eighth embodiment.

The landscape pebble manufactured in this embodiment has a highly enhanced water absorption rate of about 30 wt %. The landscape pebble having the water absorption rate of 30 wt % holds water of 30 g in the landscape pebble of 100 g. This landscape pebble, also, realizes a very excellent characteristic of holding water in the same way as that of the fifth embodiment because the water is absorbed into its micro pores, and holds water of about 30% even after the time of 400 hours (16.7 days) has lapsed.

Further, the manufactured landscape pebble realizes strength enough to resist destruction even when persons walk on a concrete or ground covered therewith. Destructive strength is measured by interposing the landscape pebble sintered in a spherical shape between flat metal surfaces which do not deform and by locally pressing the interposed landscape pebble. In this case, the landscape pebble is not destroyed until it is pressed at a pressure of about 189 N. Thus, there is no case that the covered landscape pebble will be destroyed due to the weight of person's body when he or she treads it with shoes.

As this invention may be embodied in several forms without departing from the sprit or the essential characteristics thereof, the present embodiment is therefore illustrative and not restrictive. Since the scope of the invention is defined by the appended claims rather than by the description preceding them, and all changes that fall within the metes and bounds of the claims, or the equivalence of such metes and bounds thereof are therefore intended to be embraced by the claims.

This application is based on applications No. 2003-413822 filed in Japan on Dec. 11, 2003 and No. 2003-415452 filed in Japan on Dec. 12, 2003, the contents of which are incorporated hereinto by reference.

What is claimed is:

1. A method for manufacturing a porous pebble capable of holding water therein to cool the air, the method comprising:
a pelletizing process including pelletizing fly ash containing unburned carbon of at least 10 wt % using water as a binder without adding an inorganic binder and of forming the pelletized fly ash into unsintered particles having an average diameter of 2 mm to 30 mm; and
a firing process including sintering the unsintered particles obtained in the pelletizing process at a temperature in a range of 1050° to 1200° so as to obtain a pebble having a compression strength of at least 50 N and a water absorption rate of at least 40 wt %.

2. The method for manufacturing a porous pebble according to claim 1, wherein, in the pelletizing process, core particles are pelletized from the fly ash containing unburned carbon of at least 15 wt %.

3. The method for manufacturing a porous pebble according to claim 1, wherein, in the pelletizing process, core particles are pelletized from the fly ash containing unburned carbon of at least 20 wt %.

4. The method for manufacturing a porous pebble according to claim 1, wherein, in the pelletizing process, water is added to the fly ash, the fly ash is rolled on a dish, and the rolled fly ash is pelletized.

5. A method for manufacturing a porous pebble capable of holding water therein to cool the air, method comprising:
a pelletizing process including adding a binder to fly ash containing unburned carbon and pelletizing the fly ash into core particles;
a coating process including coating surfaces of the core particles obtained in the pelletizing process with an inorganic powder containing fly ash having a less content of unburned carbon and a greater content of iron oxide than the fly ash constituting the core particles or an inorganic powder including a fine powder of a rock to thus form a surface layer on the core particles and obtaining unsintered particles having an average diameter of a range 2 mm to 30 mm; and
a firing process including firing the unsintered particles obtained in the coating process to sinter the core particles and their surface layers, making both the core particles and their surface layers porous, and sintering the surface layers at a temperature in a range of 1000° to 1200° so as to provide a strength that is stronger than the core particles while making the core particles porous so as to obtain a pebble having a compression strength of at least 50 N and a water absorption rate of at least 40 wt %

6. The method for manufacturing a porous pebble according to claim 5, wherein, in the pelletizing process, core particles are pelletized from the fly ash containing unburned carbon of at least 5 wt %.

7. The method for manufacturing a porous pebble according to claim 5, wherein, in the pelletizing process, core particles are pelletized from the fly ash containing unburned carbon of at least 10 wt %.

8. The method for manufacturing a porous pebble according to claim 5, wherein the sintering is performed so that air layers are formed between the surface layers and the core particles.

9. The method for manufacturing a porous pebble according to claim 1, wherein, in the pelletizing process, the content of the unburned carbon is set at 40 wt % or less.

* * * * *